(12) United States Patent
Maansaari et al.

(10) Patent No.: US 10,250,285 B2
(45) Date of Patent: Apr. 2, 2019

(54) APPARATUS AND METHOD FOR A COMMUNICATION NETWORK

(75) Inventors: Kirsi Maansaari, Oulu (FI); Miikka Kirveskoski, Oulu (FI); James Robinson, Oxfordshire (GB); Chad Marshburn, Copenhagen (DK); Peter Danielsen, Hellerup (DK); Per Braginski, Copenhagen (DK)

(73) Assignee: Nokia Technologies Oy, Espoo (FI)

( * ) Notice: Subject to any disclaimer, the term of this patent is extended or adjusted under 35 U.S.C. 154(b) by 365 days.

(21) Appl. No.: 14/112,676

(22) PCT Filed: Apr. 28, 2011

(86) PCT No.: PCT/IB2011/051875
§ 371 (c)(1),
(2), (4) Date: Oct. 18, 2013

(87) PCT Pub. No.: WO2012/146949
PCT Pub. Date: Nov. 1, 2012

(65) Prior Publication Data
US 2014/0045551 A1     Feb. 13, 2014

(51) Int. Cl.
*G06K 7/00*     (2006.01)
*H04M 1/725*     (2006.01)
(Continued)

(52) U.S. Cl.
CPC ......... *H04B 1/3816* (2013.01); *G06K 7/0069* (2013.01); *H04M 1/72519* (2013.01);
(Continued)

(58) Field of Classification Search
CPC .. H04B 1/3816; H04W 12/06; H04W 76/028; G06K 7/0069; H04M 1/72563; H04M 1/72519
See application file for complete search history.

(56) References Cited

U.S. PATENT DOCUMENTS

| 5,987,325 A | 11/1999 | Tayloe |
| 2002/0103009 A1 | 8/2002 | Sato |

(Continued)

FOREIGN PATENT DOCUMENTS

| CN | 1882189 A | 12/2006 |
| CN | 101292479 A | 10/2008 |

(Continued)

OTHER PUBLICATIONS

Office action received for corresponding Chinese Patent Application No. 201210013388.X, dated May 11, 2015, 11 pages of office action and 3 pages of office action translation Available.

(Continued)

*Primary Examiner* — Andrew Wendell
*Assistant Examiner* — Maryam Soltanzadeh
(74) *Attorney, Agent, or Firm* — Harrington & Smith (57) ABSTRACT

Embodiments of the invention relate to an apparatus, and method for a communication network. Certain embodiments provide an apparatus comprising: a first reader configured to read a user insertable integrated circuit configured to identify a user in a communications network; a second reader configured to read a user insertable integrated circuit configured to identify a user in a communications network; at least one memory storing computer program instructions; and at least one processor configured to execute the computer program instructions to cause the apparatus at least to perform: generating a control signal responsive to removal of an integrated circuit from the second reader.

18 Claims, 11 Drawing Sheets

(51) Int. Cl.
  *H04W 12/06* (2009.01)
  *H04W 76/19* (2018.01)
  *H04B 1/3816* (2015.01)

(52) U.S. Cl.
  CPC ....... *H04M 1/72563* (2013.01); *H04W 12/06* (2013.01); *H04W 76/19* (2018.02)

(56) References Cited

U.S. PATENT DOCUMENTS

| | | | |
|---|---|---|---|
| 2005/0096087 A1 | 5/2005 | Kim | |
| 2005/0207562 A1* | 9/2005 | Nachef | G06F 8/60 379/357.01 |
| 2008/0064443 A1 | 3/2008 | Shin et al. | |
| 2008/0132226 A1* | 6/2008 | Carnall | H04L 63/30 455/425 |
| 2008/0167074 A1* | 7/2008 | Van Steenbergen | H04W 88/06 455/558 |
| 2009/0061932 A1 | 3/2009 | Nagarajan | |
| 2010/0088454 A1* | 4/2010 | Chang | G06F 1/3215 710/313 |
| 2010/0099381 A1 | 4/2010 | Nakama | |
| 2011/0111803 A1* | 5/2011 | Fujino | H04W 52/0206 455/558 |
| 2013/0303139 A1* | 11/2013 | Helfre | H04W 4/16 455/417 |

FOREIGN PATENT DOCUMENTS

| | | |
|---|---|---|
| CN | 101431825 A | 5/2009 |
| DE | 19823074 A1 | 11/1999 |
| DE | 102010043878 A1 | 5/2012 |
| EP | 0586081 B1 | 9/1994 |
| EP | 1223768 | 7/2002 |
| EP | 1223768 A1 | 7/2002 |
| EP | 1624649 | 2/2006 |
| EP | 2453633 A1 | 5/2012 |
| JP | 07-312630 A | 11/1995 |
| JP | 2002-218536 A | 8/2002 |
| KR | 2010-0131299 A | 12/2010 |
| WO | 2001/019120 A1 | 3/2001 |
| WO | 2008011550 | 1/2008 |
| WO | 201014078 | 12/2010 |
| WO | 201040781 | 12/2010 |
| WO | 2010140781 | 12/2010 |

OTHER PUBLICATIONS

Office Action received for corresponding European Application No. 13197783.7-1972, dated Jul. 18, 2014, 7 pages.
International Search Report received for corresponding Patent Cooperation Treaty Application No. PCT/IB2011/051875, dated Jan. 20, 2012, 5 pages.
Office action received for corresponding Chinese Patent Application No. 201210013388.X, dated Oct. 23, 2014, 11 pages of office action and 7 pages of office action translation.
Office Action received for corresponding Chinese Application No. 201210013388.X, dated Mar. 19, 2014, 21 pages.
Office Action received for related Singaporean Application No. P-00201100847, dated Dec. 23, 2013, 2 pages.
Office action received for corresponding Korean Patent Application No. 2013-7031651, dated Jan. 13, 2015, 6 pages of office action and no English translation of office action available.
Extended European Search Report received for corresponding European Patent Application No. 11864519.1, dated Dec. 18, 2014, 8 pages.
Office action received for corresponding German Patent Application No. 1020110882391, dated Jun. 25, 2012, Only 2 pages of Office Action Translation Available.
Office action received for corresponding German Patent Application No. 1020110882391, dated Dec. 11, 2012, 4 pages of office action, No English Language Translation available.

\* cited by examiner

APPARATUS AND METHOD FOR A COMMUNICATION NETWORK

RELATED APPLICATION

This application was originally filed as PCT Application No. PCT/IB2011/051875 filed Apr. 28, 2011.

FIELD OF THE INVENTION

Embodiments of the present invention relate to an apparatus and method in a communication network. In particular, though without prejudice to the foregoing, embodiments relate to an apparatus and method for use in a terminal device of a wireless cellular communication network.

BACKGROUND TO THE INVENTION

Many wireless portable communication devices comprise a subscriber identification module or 'SIM card' which is an integrated circuit that securely stores information used to identify and authenticate a user/subscriber to a cellular communication network and enable connection of the device to the network. Typically, a wireless portable communication device comprises a single SIM card reader located underneath the device's battery. This impedes a user's ability to replace one SIM card with another.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

BRIEF DESCRIPTION OF VARIOUS EMBODIMENTS OF THE INVENTION

According to various, but not necessarily all, embodiments of the invention there is provided an apparatus comprising:
  a first reader configured to read a user insertable integrated circuit configured to identify a user in a communications network;
  a second reader configured to read a user insertable integrated circuit configured to identify a user in a communications network;
  at least one memory storing computer program instructions; and
  at least one processor configured to execute the computer program instructions to cause the apparatus at least to perform:
    generating a control signal responsive to removal of an integrated circuit from the second reader.

The user insertable integrated circuit is used to identify and authenticate a user/subscriber to a communication network and enable access and connection of the apparatus to the network. The integrated circuit may for example be:
  a Subscriber Identity Module or Subscriber Identification Module (SIM) for use with a Global System for Mobile Communications (GSM) network,
  a Universal Integrated Circuit Card (UICC) for use in Universal Mobile Telecommunications System (UMTS) network, or
  a Removable User Identity Module (R-UIM) for use in network using Code Division Multiple Access (CDMA).

Certain embodiments seek to enable a function to be effected in response to the removal of an integrated circuit from the second reader. A control signal is generated responsive to the removal which can be used to trigger an operation or function. For example, where an application on the apparatus is running and active at the time the integrated circuit is removed, the application may be caused to: have its state saved, be suspended or closed down in response to the control signal. Alternatively, a communication channel which is open and active upon removal of an integrated circuit may be caused to be maintained in an open and active state.

According to various, but not necessarily all, embodiments of the invention there is provided a method comprising causing, at least in part, actions that result in:
  generating, in an apparatus comprising a first reader configured to read a user insertable integrated circuit configured to identify a user in a communications network and a second reader configured to read a user insertable integrated circuit configured to identify a user in a communications network, a control signal responsive to removal of an integrated circuit from the second reader.

According to various, but not necessarily all, embodiments of the invention there is provided an apparatus comprising:
  a first reader configured to read a user insertable integrated circuit configured to identify a user in a communications network;
  a second reader configured to read a user insertable integrated circuit configured to identify a user in a communications network;
  at least one memory storing computer program instructions; and at least one processor configured to execute the computer program instructions to cause the apparatus at least to perform:
    causing a diversion of a communication directed to an integrated circuit inserted in one of the readers to an integrated circuit inserted in the other of the readers.

According to various, but not necessarily all, embodiments of the invention there is provided a method comprising causing, at least in part, actions that result in:
  causing, in an apparatus comprising a first reader configured to read a user insertable integrated circuit configured to identify a user in a communications network and a second reader configured to read a user insertable integrated circuit configured to identify a user in a communications network, the diversion of a communication directed to an integrated circuit inserted in one of readers to an integrated circuit inserted in the other of the readers.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
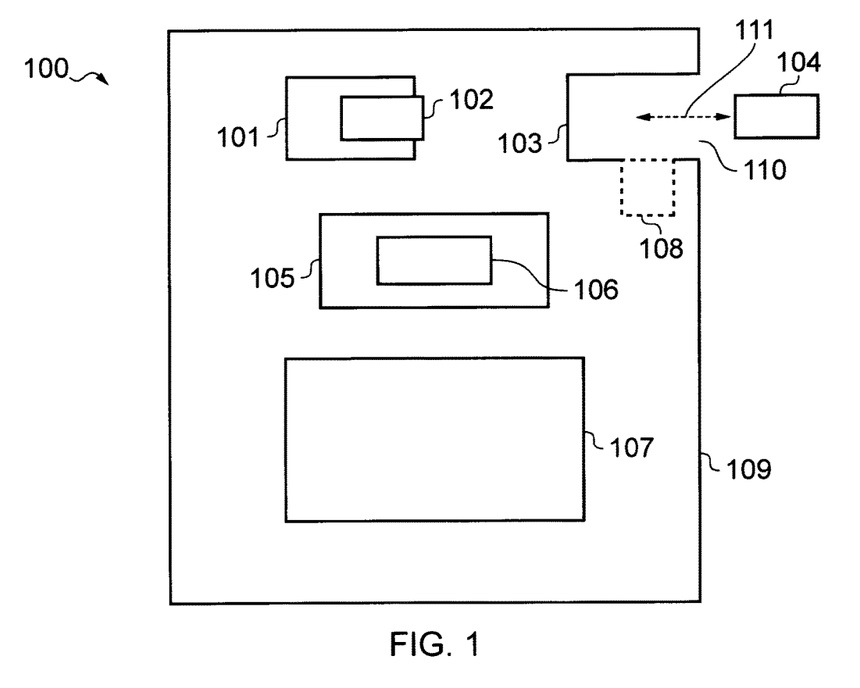
FIG. 1 schematically illustrates an apparatus according to an embodiment of the present invention.

FIG. 1 illustrates an apparatus 100 according to an embodiment of the invention. Only the functional components that are necessary for describing the operation of the apparatus are shown. The apparatus 100 comprises:

- a first reader 101 configured to read a user insertable integrated circuit (I/C) 102 configured to identify a user in a communications network;
- a second reader 103 configured to read a user insertable I/C 104 configured to identify a user in a communications network;
- at least one memory 105 storing computer program instructions 106; and
- at least one processor 107 configured to execute the computer program instructions to cause the apparatus at least to perform:
    generating a control signal responsive to removal of an I/C 104 from the second reader 103.

The user insertable integrated circuit is used to identify and authenticate a user/subscriber to a communication network and enable access and connection of the apparatus to the network The apparatus 100 may be a module or a communication device such as a wireless portable handheld communication device. The communications network may, for example be a wireless communications network or a cellular communications network. The apparatus may have additional functions beside communication.

The processor 107 is configured to read from and write to the memory 105. The processor may also comprise an output interface via which data and/or commands such as the control signal are output by the processor and an input interface via which data and/or commands are input to the processor. The apparatus may further include input and output devices, such as a touch screen, as well as a transmitter and receiver (not shown)

Although the memory 105 is illustrated as a single component it may be implemented as one or more separate components some or all of which may be integrated/removable and/or may provide permanent/semi-permanent/dynamic/cached storage. The memory 105 stores a computer program comprising computer program instructions 106 that control the operation of the apparatus 100 when loaded into the processor 107. The processor, by reading the memory, is able to load and execute the computer program.

The processor or controller may be implemented using instructions that enable hardware functionality, for example, by using executable computer program instructions 106 in a general-purpose or special-purpose processor that may be stored on a computer readable storage medium 112 (disk, memory etc) or carried by a signal carrier to be executed by such a processor. The computer program instructions 106 provide the logic and routines that enables the processor to perform the methods illustrated in FIGS. 2 to 7 and described below.

The second reader 103 may be configured to detect the removal of an I/C 104 inserted therein. Alternatively a separate detector 108 may be provided to detect the removal. Such a detector may comprise an electro mechanical device that facilitates the ejection of the I/C for removal by a user upon user actuation and also provides a signal to the processor indicating the removal of the I/C. The device may bring about the ejection in a two stage process. For example, an initial user actuation, such as a push or depression of the card into the card reader, might initiate a first stage during which electrical connection of the I/C and the reader is maintained and a signal is caused to be sent to the processer forewarning of the impeding removal and disconnection of the I/C in the second stage of the removal. The two stage ejection process provides a window of opportunity to enable the I/C temporarily to continue to function so as to enable appropriate shutting down of I/C activities, e.g. effecting a disconnection protocol to a connected network, and cessation of electrical power to the I/C prior to the actual physical removal of the I/C by a user. A similar two stage mechanism and process may be used for inserting an I/C into the reader.

In an alternative embodiment, a card detection switch is provided to generate a signal that indicates the presence or absence of an I/C in the reader (e.g. switch=ON if I/C present and switch=OFF is I/C absent). A pre-warning switch may additionally be provided to generate a signal that indicates the presence or absence of an initial preliminary user actuation to remove or insert an I/C, such as a preliminary "push" of the I/C into the reader that might be a pre-requisite in the insertion or removal of the I/C (e.g. switch=ON upon push of I/C into reader and switch=OFF otherwise). Signals from these switches can be used to determine whether an I/C is present in the reader or not and also to provide a forewarning and trigger of an impending removal or insertion of an I/C. For example, a card detection switch OFF signal followed by a pre-warning switch ON signal would indicate the impending insertion of an I/C. Whereas, a card detection switch ON signal followed by a pre-warning switch ON signal would indicate the impending removal of an I/C which could act as a trigger to generate a control signal.

The second reader 103 is arranged such that, in use, an I/C inserted therein is more accessible by a user for removal than an I/C inserted in the first reader. Likewise the second reader is more accessible than the first reader for insertion of an I/C. In one embodiment the apparatus is housed within an exterior housing 109, such as a mobile phone casing. The housing comprises an aperture 110 defined therein. The second reader may be disposed and orientated within the housing such that an integrated circuit 104 is insertable into and removable from (as indicated by the arrows 111) the second reader via the aperture. The first reader may be less accessible for example by being disposed beneath a battery of the apparatus so as to necessitate the removal of the battery and thus the powering down of the of apparatus in order to insert/remove an I/C in to/from the first reader.

In an alternative embodiment, the second reader is disposed within the exterior housing so as to require removal of at least portion of the housing in order to gain access the second reader for insertion/removal of an I/C. For example, the second reader may be disposed and orientated so as to require a battery cover of a mobile phone casing to be removed, but not the removal of the battery itself, in order to allow access to the second reader. The first reader may be less accessibly disposed, e.g. beneath a battery so as to necessitate removal of the battery in order to insert/remove an I/C into/from the first reader.

Advantageously, the apparatus is configured so as to enable the removal or insertion of an I/C from or into the second reader without requiring the removal of a battery or the powering down of the apparatus, i.e. the I/C can be removed from or inserted into the second reader whist the apparatus is still on. Moreover, the removal of the I/C is detected and used to generate a control signal trigger that can be used to cause a function to be performed.

The component blocks illustrated in the apparatus of FIG. 1 are functional and the functions described may or may not be performed by a single physical entity as shown in the figure The apparatus may be provided in a module. As used here 'module' refers to a unit or apparatus that excludes certain parts/components that would be added by an end manufacturer or a user.

Although the apparatus is described in terms of comprising various components, it should be understood that the components may be embodied as or otherwise controlled by a corresponding processing element or processor of the apparatus 100. In this regard, each of the components described above may be any device, means or circuitry embodied in hardware, software or a combination of hardware and software that is configured to perform the corresponding functions of the respective components as described in the method blocks below.

In one embodiment, the apparatus 100 is embodied on a hand held portable electronic device, such as a mobile telephone or personal digital assistant, that may additionally provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. Moving Picture Experts Group-1 Audio Layer 3 (MP3) or other format and/or (frequency modulation/amplitude modulation) radio broadcast recording/playing), downloading/sending of data functions, image capture function (e.g. using a (e.g. in-built) digital camera), and gaming functions.

In one particular embodiment, the apparatus comprises only a single antenna/modem/protocol stack. The apparatus is configured such that both I/C's are active and available to their respective communication network at the same time. The apparatus is further configured such that each I/C can be used to receive calls and texts as well as make a call or send a text on the fly. However, due to the fact that there is only one antenna/modem, there can be only one of the I/C's in use on a network at a time, i.e. use in transmission of a voice call or text message, during which time the other I/C is not able to be used on the network and is temporarily unreachable.

In an alternative embodiment the apparatus is configured such that both I/C's are available to their respective communication network at the same time. The apparatus is further configured such that each I/C can be used to receive calls and texts as well as make a call or send a text on the fly. In said alternative embodiment both I/C's are available to their respective communication network using a time division air interface and each I/C is available to communicate in a different time slot to the other I/C.

In an alternative embodiment the apparatus is configured such that both I/C's are available to their respective communication network at the same time. One of the I/C's is configured to communicate using a frequency division air interface e.g. CDMA, WCDMA.

Figure 1A:
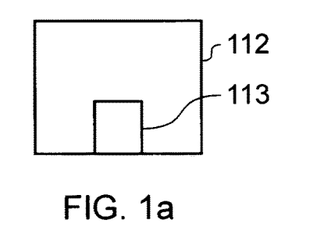
FIG. 1a schematically illustrates a computer readable storage medium according to an embodiment of the present invention.

The computer program comprising the computer program instructions 106 may arrive at the apparatus 100 via any suitable delivery mechanism. The delivery mechanism may be, for example, a non-transitory computer-readable storage medium (as shown in FIG. 1*a*), a computer program product, a memory device, a record medium such as a compact disc read-only memory or digital versatile disc, an article of manufacture that tangibly embodies the computer program. The delivery mechanism may be a signal configured to reliably transfer the computer program.

FIG. 1*a* illustrates a computer readable storage medium 112 with instructions 113 that, when executed by a processor, performs the method as discussed below and illustrated in FIGS. 2-7.

Figure 2:
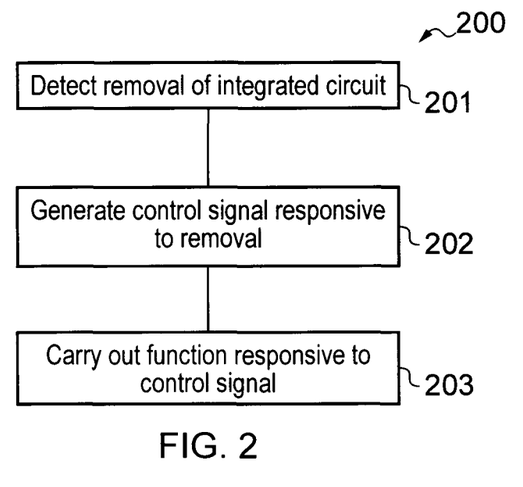
FIG. 2 illustrates a flowchart of a method according to an embodiment of the present invention.

The flowchart of method blocks 200 illustrated in FIG. 2 represent one possible scenario among others. Not all the blocks are essential. As indicated in method block 201, removal of the I/C from the second reader 201 is detected. This detection could be effected by the reader itself or a separate detector. Responsive to the detection, a control signal is generated 202. The control signal can be used to effect a function 203. Accordingly, a function can be effected in response to the removal of the I/C from the second reader.

Figure 3:
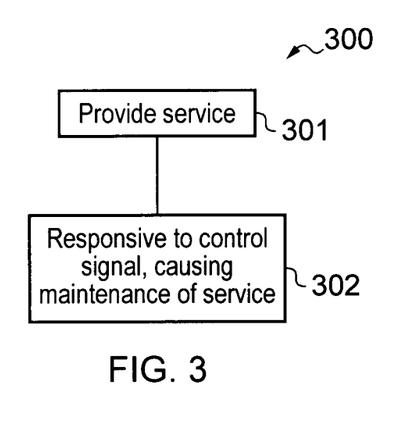
FIG. 3 illustrates a flowchart of method blocks involved in an embodiment of the present invention.

As indicated in the flowchart of method blocks 300 of FIG. 3, a service may be provided 301, such as the running of an application or a communication service. The application may comprise: a native application (e.g. address book or message editor,) a foreground runtime application (e.g. third party software such as a game) or software components capable of running either in foreground or background (e.g. Java MIDlets). The communication service may comprise a voice, text or data communication and reception/transmission related to such communication or an open communication channel in the communication network.

In response to a control signal (generated as described above), the processor causes the maintenance of the service as represented by method block 302.

Figure 4:
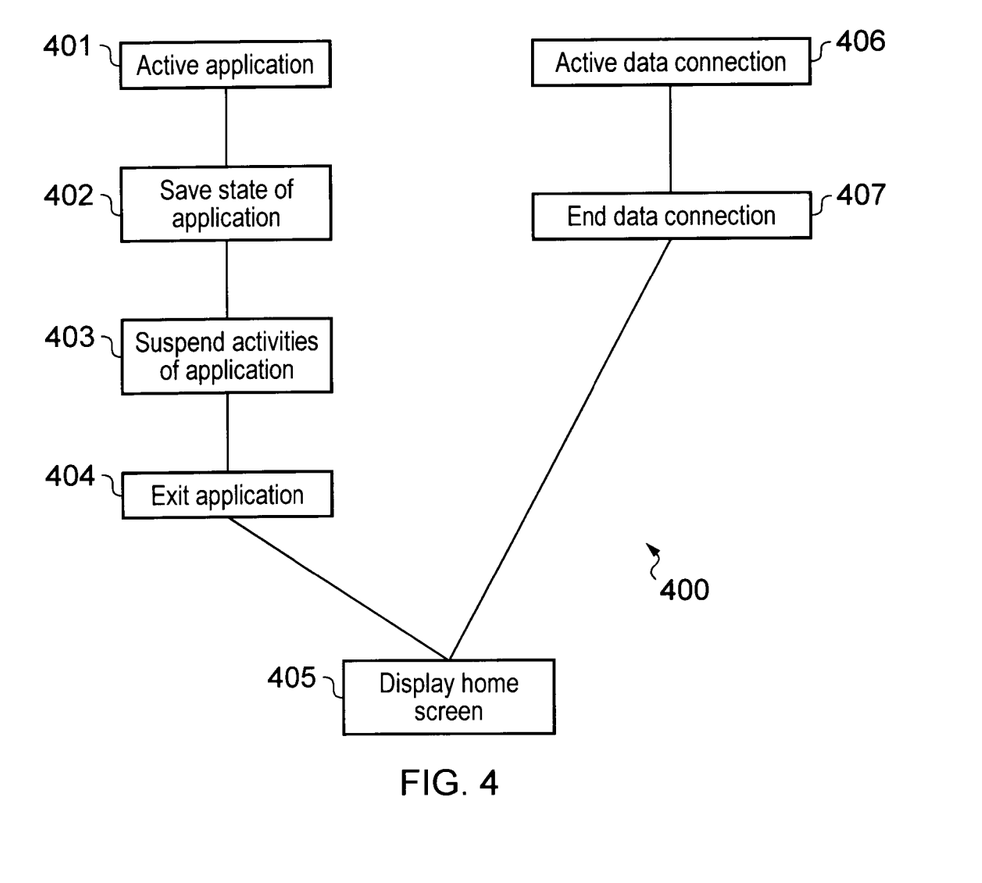
FIG. 4 illustrates a flowchart of method blocks involved in an embodiment of the present invention.

FIG. 4 illustrates a flowchart of method blocks 400. Not all the method blocks are essential.

Where an application is active and running as represented by method block 401, the following method blocks may occur:

saving a current state of the application 402, and causing an application to suspend activities 403.

Optionally, applications running in the foreground could be moved to run in the background. Also, applications including native and foreground runtime applications could be caused to close as indicated in method block 404. The apparatus may be forced into an 'idle mode' where no actions or processes occur and the apparatus' home screen is displayed 405.

Advantageously, by suspending an application such that it can no longer take any action or saving a state of the application then exiting the application, the application may be revived or restored to the state it was in prior to the removal of the I/C thereby enabling a maintenance of the service.

The right hand branch of the flowchart illustrates what the apparatus is configured to do where a data connection to a network is active upon removal of an I/C from the second reader, as indicated in method block 406. Here the data connection is caused to end 407 and the apparatus is placed into an 'idle mode' and the apparatus' home screen is displayed 405.

Figure 4A:
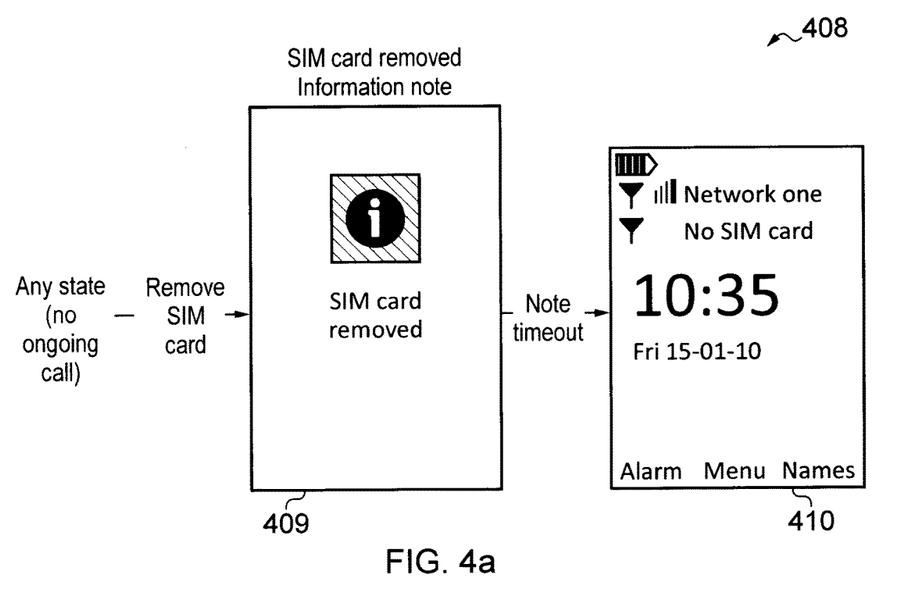
FIG. 4a illustrates screen shots displayed by an apparatus performing the method of FIG. 4.

FIG. 4a illustrates screen shots 408 that may be displayed on a display of an apparatus when performing the method of FIG. 4. When the apparatus is in any state except a state where there is an active voice communication occurring, upon removal of the I/C from the second reader, an information note 409 is displayed showing information related to the removal and after a timeout period the home screen 410 is displayed.

Figure 5:
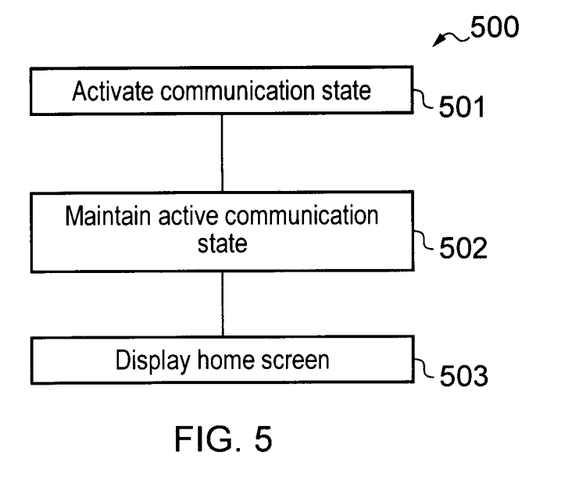
FIG. 5 illustrates a flowchart of method blocks involved in an embodiment of the present invention.

FIG. 5 shows a flowchart of method blocks 500. Method block 501 relates to there being an active ongoing incoming or outgoing voice communication involving an I/C inserted in the first reader at the time of removal of an I/C from the second reader. The active communication can be caused to be maintained 502 in spite of the apparatus entering into an idle mode in which home screen is displayed 503.

In certain embodiments, entering the apparatus to an idle mode involves executing a software component module that causes all services, i.e. all applications and all communication connections to be closed so as to put the apparatus into a idle mode where no actions and processing occurs or where no communication channels are open. In the method of FIG. 5, the software component module which effects the shutting down of all services to enter into the idle mode is modified responsive to the control signal so as to provide an exception to the closing of all services and maintain at least one service, e.g. an active voice communication such as an open voice communication channel. Thereby, the processor causes the maintenance of the voice communication when entering into the modified idle mode upon removal of the I/C from the second reader.

Figure 5A:
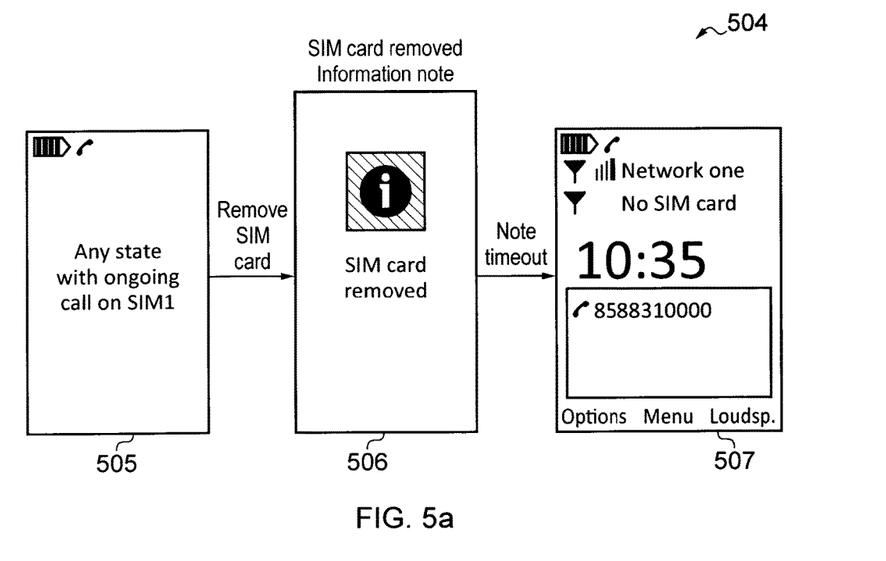
FIG. 5a illustrates screen shots displayed by an apparatus performing the method of FIG. 5.

FIG. 5a illustrates screen shots 504 that may be displayed on a display of an apparatus when performing the method of FIG. 5. When the apparatus is in a state where there is an active voice communication occurring as represented in screen shot 505, upon removal of an I/C from the second reader, an information note 506 is displayed showing information related to the removal and after a timeout period the home screen 507 is displayed, all the while the voice communication state is maintained even when in the modified idle mode.

Figure 6:
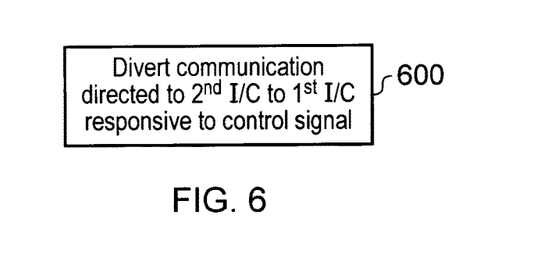
FIG. 6 illustrates a method block involved in an embodiment of the present invention.

FIG. 6 illustrates method block 600, which can be implemented on its own or in combination with the other described embodiments herein. As indicated in the method block 600, a processor may be configured to cause a diversion or re-routing of a communication in response to the control signal. In this embodiment, a first I/C inserted in the first reader is associated with a first Mobile Subscriber Integrated Services Digital Network Number (MSISDN number) i.e. telephone number. A second I/C inserted in the second reader is associated with a second MSISDN telephone number. When the second I/C is removed, a control signal is generated, responsive to which the processor is configured automatically cause the diversion of calls directed to the second telephone number to the first telephone number.

Whilst the discussion of the method block of FIGS. 2-6 have been in reference to the generation of a control signal responsive to removal of an I/C, embodiments of the invention also extend to the generation of a control signal responsive to insertion of an I/C the necessary changes having been made.

Figure 7:
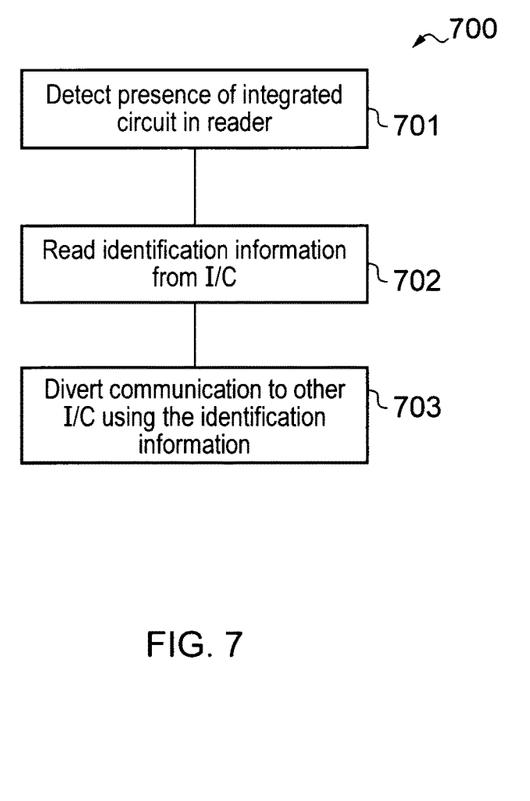
FIG. 7 illustrates a flowchart of method blocks involved in an embodiment of the present invention.

FIG. 7 illustrates a further embodiment with method blocks 700 implementable by an apparatus such as that of FIG. 1. Not all the blocks in FIG. 7 are essential. The apparatus is configured to detect the presence of an I/C in one of the readers as represented by method block 701. This detection could be effected by the reader itself or a separate detector. Information, e.g. relating to user/subscriber identification such as the MSISDN, is read from the I/C as represented by method block 702 and optionally is stored in a memory of the apparatus. This information is used to enable the processor to cause the set up of a call diversion/call re-routing. This can be achieved, for example by causing the transmission of a signal to a communication network requesting a call diversion and providing information relating to where the call is to be diverted to so as to enable the network to establish a Call Forward Unconditional (CFU) Number.

Advantageously, this embodiment facilitates the setting up of a call diversion/re-routing from a MSISDN associated with an I/C to an MSISDN associated with another I/C. For example, in one particular embodiment, a call diversion/re-routing can be simply set up for a call initially directed to a telephone number associated with a SIM inserted in one reader to be diverted to a telephone number associated with another SIM inserted in the other reader without requiring the user manually to input and specify the telephone number associated with the other SIM.

Figure 7A:
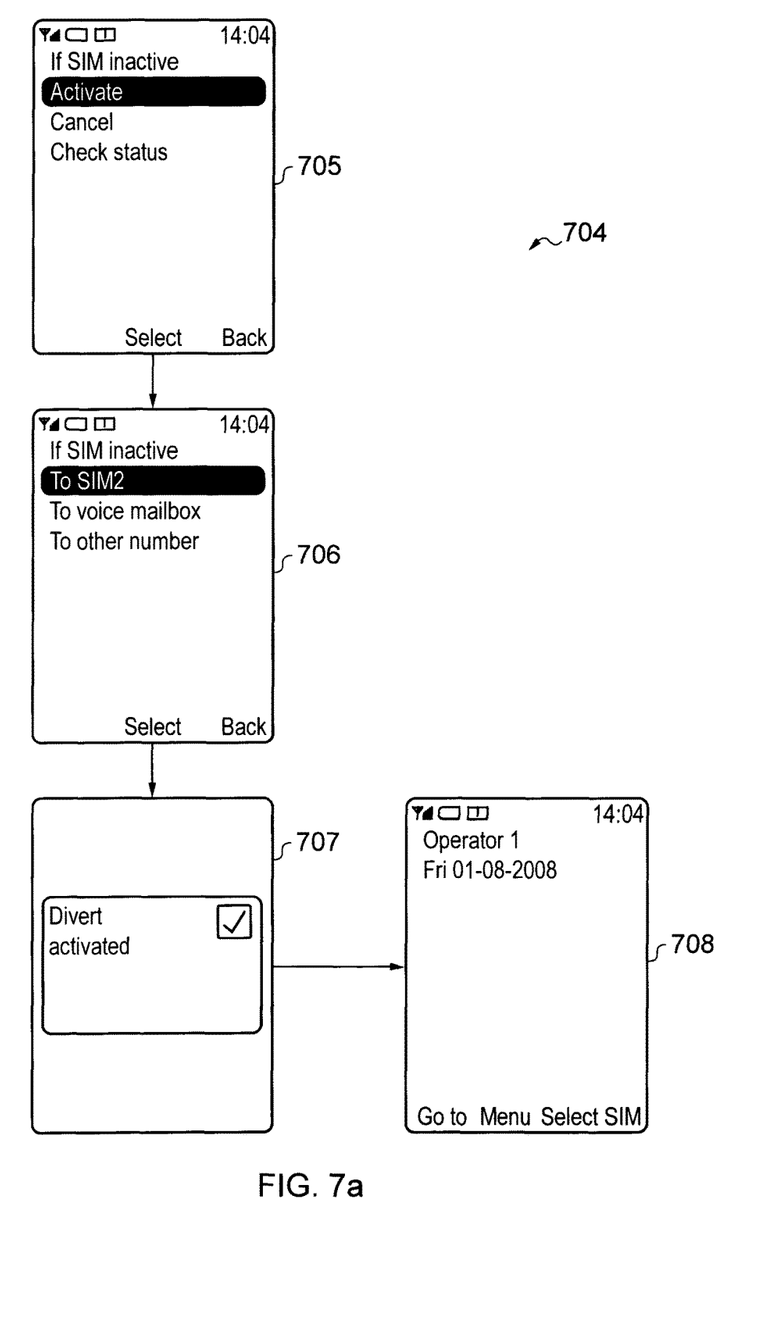
FIG. 7a illustrates screen shots displayed by an apparatus performing the method of FIG. 7.

FIG. 7a illustrates example screen shots 704 that may be displayed on a display of an apparatus when performing the method of FIG. 7. In this example, a first SIM in the first reader has been deactivated. A screen shot of the menu for setting up a call diversion for the first SIM is shown in screen 705. Upon a user selection to "Activate" call diversion, screen 706 is displayed. Here options are presented to a user to divert calls:

To SIM2, i.e. the I/C inserted in the second reader

To voice mailbox, or

To other number, i.e. a number to be specified and manually inputted by user.

Upon a user selection of "To SIM2", a call divert operation is carried out by informing the network of the call diversion. Once completed, an information note informing the user that the call divert is activated is displayed as shown in screen shot 707. After a timeout period the note is removed and the home screen is displayed as indicated in screen 708.

In an alternative embodiment, SIM1 is not deactivated but is available to receive text or picture messages. Voice calls are diverted as outlined above.

Figure 8:
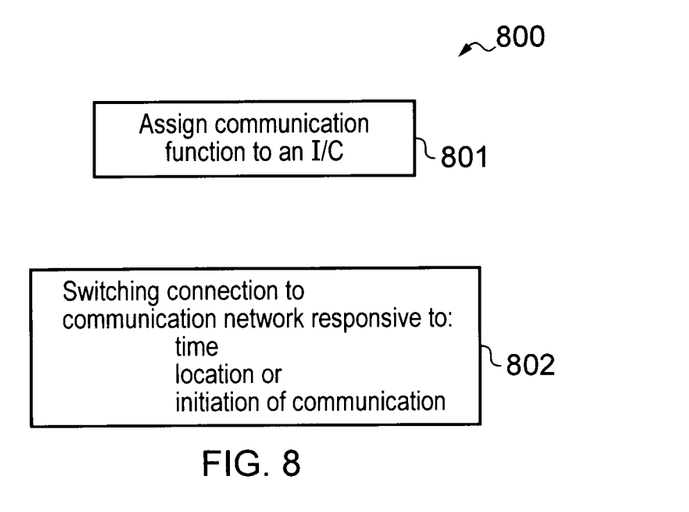
FIG. 8 illustrates method blocks involved in an embodiment of the present invention.

FIG. 8 illustrates method blocks 800, each of which can be implemented on their own or in combination with other method blocks. In method block 801 the processor is configured to cause a communication function of the apparatus to be assignable to an integrated circuit inserted in either of the readers. For example, one of the inserted I/C's could be assigned so as to carry out all outgoing voice communications and/or another of the inserted I/C's could be assigned so as to carry out all outgoing text communication. In this embodiment, were the apparatus to be connected to a network via a first I/C in the first reader, and a text message were to be sent, the processor would disconnect from the network and connect to a network via the second I/C and then send the text message.

Advantageously, a communication function (voice, text or data) could be assigned to and effected by an inserted I/C that is not currently active, that is to say not used in the connection to a currently connected network.

A database may be provided which stores information concerning I/C's and communication functions assigned thereto. Accordingly, a record of an I/C not currently inserted in one of the readers can be stored along with its assigned function so that when such an I/C is inserted it can be used in effecting its assigned communication function, e.g. data (i.e. non-voice or text) communication.

In method block 802 the processor is configured so as to cause the automatic switching of which I/C is used to connect to a communication network based upon a trigger. The trigger may relate to receipt of at least one of:

a) a signal related to time information (e.g. from an internal clock)
b) a signal related to location information (e.g. from an on board positioning device or received from the network)
c) a signal related to initiation of a communication.

A time based trigger would enable, for example, connection to a communication network via one of the inserted I/C's during certain hours and connection to a network (the same or another network) via the other of the inserted I/C's. Advantageously, this would enable, for example, one 'work SIM' to be used during working hours and another 'home SIM' to be for non-working hours. Similarly, with a location based trigger, one SIM could be assigned for use at a particular area with another SIM assigned to another area. Advantageously, this would enable, for example, one SIM to be used when in a user's home country and the other SIM to be used when abroad.

Switching which I/C is used to connect to a communication network in response to initiation of a communication (i.e. a voice call, text message or data transmission) may be particularly applicable to the example given above with reference to method block 801. For example, where the apparatus is connected to a first network via a first I/C and a text message is to be sent but the sending of text messages has been assigned to the second I/C. In this scenario, upon detection of initiation of the text communication, e.g. a signal for causing the transmission of the text message, the connection to first network is disconnected and connection to the second network via the second I/C is effected following which the text message is caused to be transmitted.

In the above description, the wording 'connect' and 'couple' and their derivatives mean operationally connected/coupled. It should be appreciated that any number or combination of intervening components can exist (including no intervening components). Implementation of a processor or controller can be in hardware alone (e.g. a circuit) have certain aspects in software including firmware alone or can be a combination of hardware and software (including firmware).

References to 'computer-readable storage medium', 'computer program', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Embodiments of the present invention provide both a method and corresponding apparatus consisting of various modules or means that provide the functionality for performing the steps of the method. The modules or means may be implemented as hardware, or may be implemented as software or firmware for execution by a computer processor. In particular, in the case of firmware or software, embodiments of the invention can be provided as a computer program product including a computer readable storage structure embodying computer program code (i.e., the software or firmware) thereon for execution by the computer processor.

The method blocks illustrated in FIGS. 2-7 may represent actions in a method and/or sections of code in computer program instructions.

The illustration of a particular order to the blocks does not necessarily imply that there is a required or preferred order for the blocks and the order and arrangement of the block may be varied. Furthermore, it may be possible for some steps to be omitted.

It will be understood that each block and combinations of blocks, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory storage device and executed by a processor. As will be appreciated, any such computer program instructions may be loaded onto a computer or other programmable apparatus (i.e., hardware) to produce a machine, such that the instructions which execute on the programmable apparatus create means for implementing the functions specified in the blocks. These computer program instructions may also be stored in a computer-readable medium that can direct a programmable apparatus to function in a particular manner, such that the instructions stored in the computer-readable memory produce an article of manufacture including instruction means which implement the function specified in the blocks. The computer program instructions may also be loaded onto a programmable apparatus to cause a series of operational steps to be performed on the programmable apparatus to produce a computer-implemented process such that the instructions which execute on the programmable apparatus provide steps for implementing the functions specified in the blocks.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Although various embodiments of the present invention have been described in the preceding paragraphs with reference to various examples, it should be appreciated that modifications to the examples given can be made without departing from the scope of the invention as claimed.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   an exterior housing, said exterior housing comprising an aperture;

a first reader enclosed within said exterior housing, said first reader being for reading a first insertable integrated circuit for identifying a user in a first communications network, said first insertable integrated circuit being disposed beneath a power source within said exterior housing, and thereby not being removable from said exterior housing without powering down said apparatus;

a second reader in said exterior housing accessible through said aperture, said second reader being for reading a second user-insertable integrated circuit for identifying the user in the first communications network or in a second communications network, said second reader being able to detect a removal of said second user-insertable integrated circuit therefrom;

at least one processor; and at least one memory comprising computer program code, the at least one memory and the computer program code configured, with the at least one processor, to cause the apparatus to perform the following:

detect a removal of the second user-insertable integrated circuit from the second reader through said aperture;

generate a control signal in response to detection of the removal; and carry out a communication function in the first communication network in response to the generated control signal using the first insertable integrated circuit, said first insertable integrated circuit remaining powered when said second user-insertable integrated circuit is removed from the second reader through said aperture.

2. The apparatus according to claim 1, further comprising a detector for detecting removal of the second user-insertable integrated circuit from the second reader.

3. The apparatus according to claim 1, wherein the at least one memory and the computer program code are further configured, with the at least one processor, to cause the apparatus at least to:

provide at least one service, wherein the communication function is to maintain the at least one service in response to the generated control signal.

4. The apparatus according to claim 3, wherein maintenance of the at least one service comprises at least one of:

saving a state of an application associated with the at least one service, and suspend activities of an application associated with the at least one service.

5. The apparatus according to claim 4, wherein the at least one service comprises an active communication state.

6. The apparatus according to claim 5, wherein the active communication state involves use of the first insertable integrated circuit.

7. An apparatus comprising:

an exterior housing, said exterior housing comprising an aperture;

a first reader enclosed within said exterior housing, said first reader being for reading a first insertable integrated circuit for identifying a user in a first communications network, said first insertable integrated circuit being disposed beneath a power source within said exterior housing, and thereby not being removable from said exterior housing without powering down said apparatus;

a second reader in said exterior housing accessible through said aperture, said second reader being for reading a second user-insertable integrated circuit for identifying the user in the first communications network or in a second communications network, said second reader being able to detect a removal of said second user-insertable integrated circuit therefrom;

at least one processor; and at least one memory comprising computer program code, the at least one memory and the computer program code configured, with the at least one processor, to cause the apparatus to perform the following:

detect a presence of one of said first and second integrated circuits in one of said first and second readers;

cause a transmission of a signal to one of said first and second communication networks requesting a call diversion to divert a call initially directed to a first telephone number associated with one of said first and second integrated circuits to a second telephone number associated with the other of said first and second integrated circuits without user intervention; and divert a communication directed to one of the first and second integrated circuits to the other of the first and second integrated circuits.

8. The apparatus according to claim 7, further comprising a detector for detecting the presence of one of said first and second integrated circuits, wherein diversion of the communication is in response to detection of the presence of one of the first and second integrated circuits.

9. The apparatus according to claim 7, wherein the at least one memory and the computer program code are further configured, with the at least one processor, to cause the apparatus at least to:

read identification information from one of said first and second integrated circuits, and cause the diversion using the identification information.

10. The apparatus according to claim 7, wherein the at least one memory and the computer program code are further configured, with the at least one processor, to cause the apparatus at least to:

cause a communication function to be assigned to one of said first and second integrated circuits.

11. The apparatus according to claim 7, wherein the at least one memory and the computer program code are further configured, with the at least one processor, to cause the apparatus at least to:

connect to a first communication network associated with one of said first and second integrated circuits; and disconnect from the first communication network and connect to a second communication network associated with the other of said first and second integrated circuits in response to a trigger, wherein the trigger relates to at least one of a time, a location of the apparatus, and an initiation of a communication.

12. A method comprising:

in an apparatus comprising a first reader enclosed within an exterior housing of the apparatus, said exterior housing comprising an aperture, said first reader being for reading a first insertable integrated circuit for identifying a user in a first communications network, said first insertable integrated circuit being disposed beneath a power source within said exterior housing, and thereby not being removable from said exterior housing without powering down said apparatus, and a second reader in said exterior housing accessible through said aperture, said second reader being for reading a second user-insertable integrated circuit for identifying the user in the first communication network or in a second communications network, said second reader being able to detect a removal of said second user-insertable integrated circuit therefrom, detecting a removal of the second user-insertable integrated circuit from the second reader through said aperture;

generating a control signal in response to detection of the removal; and carrying out a communication function in the first communication network in response to the generated control signal using the first integrated circuit, said first integrated circuit remaining powered when said second user-insertable integrated circuit is removed from the second reader through said aperture.

13. The method according to claim 12, further comprising:

providing at least one service, wherein the communication function is maintaining the at least one service in response to the generated control signal.

14. The method according to claim 13, wherein maintenance of the at least one service comprises at least one of:

saving a state of an application associated with the at least one service, and causing an application associated with the at least one service to suspend activities.

15. The method according to claim 13, wherein the at least one service comprises an active communication state.

16. The method according to claim 15, wherein the active communication state involves use of the first insertable integrated circuit.

17. The method according to claim 12, further comprising causing a diversion of a communication directed to the second user-insertable integrated circuit inserted in the second reader in response to the generated control signal.

18. The method according to claim 17, further comprising causing the diversion of a communication directed to the second user-insertable integrated circuit inserted in the second reader to the first insertable integrated circuit inserted in the first reader.

* * * * *

UNITED STATES PATENT AND TRADEMARK OFFICE
CERTIFICATE OF CORRECTION

PATENT NO. : 10,250,285 B2
APPLICATION NO. : 14/112676
DATED : April 2, 2019
INVENTOR(S) : Maansaari et al.

It is certified that error appears in the above-identified patent and that said Letters Patent is hereby corrected as shown below:

In the Claims

In Claim 12:
Column 13, Line 8, "first" should be deleted and --first insertable-- should be inserted. (First Occurrence)

In Claim 12:
Column 13, Line 8, "first" should be deleted and --first insertable-- should be inserted. (Second Occurrence)

Signed and Sealed this
Fourteenth Day of May, 2019

Andrei Iancu
*Director of the United States Patent and Trademark Office*